United States Patent
Crowder et al.

(10) Patent No.: US 8,140,672 B2
(45) Date of Patent: Mar. 20, 2012

(54) MEDIA RESOURCE STORAGE AND MANAGEMENT

(75) Inventors: William Crowder, Camarillo, CA (US); Jeffrey Koller, Oxnard, CA (US); David Fullagar, Boulder, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 105 days.

(21) Appl. No.: 12/767,338

(22) Filed: Apr. 26, 2010

(65) Prior Publication Data

US 2010/0325264 A1    Dec. 23, 2010

Related U.S. Application Data

(60) Provisional application No. 61/172,638, filed on Apr. 24, 2009.

(51) Int. Cl.
   *G06F 15/16* (2006.01)
   *G06F 12/00* (2006.01)
(52) U.S. Cl. .................................... 709/224; 709/229
(58) Field of Classification Search .................. 709/203, 709/217–218, 223–229, 250
   See application file for complete search history.

(56) References Cited

U.S. PATENT DOCUMENTS

| | | | |
|---|---|---|---|
| 7,062,548 B1 * | 6/2006 | Peres ............................ | 709/223 |
| 2002/0133593 A1 * | 9/2002 | Johnson et al. ............... | 709/226 |
| 2006/0143404 A1 | 6/2006 | Chen et al. | |
| 2007/0268164 A1 * | 11/2007 | Lai et al. ........................ | 341/51 |
| 2007/0288485 A1 * | 12/2007 | Shin et al. ....................... | 707/10 |
| 2008/0215747 A1 | 9/2008 | Menon et al. | |
| 2009/0019091 A1 | 1/2009 | Horvitz et al. | |
| 2009/0037382 A1 | 2/2009 | Ansari et al. | |
| 2009/0049238 A1 | 2/2009 | Zhang et al. | |
| 2009/0083279 A1 | 3/2009 | Hasek | |

OTHER PUBLICATIONS

International Search Report, International Publication No. WO 2010/124291, Appl. PCT/US2010/032436, International Filing Date Apr. 26, 2010, Date of Mailing Search Report Jun. 29, 2010, 2 pgs.
Written Opinion of the International Searching Authority, International Publication No. WO 2010/124291, Appl. PCT/US2010/032436, International Filing Date Apr. 26, 2010, Date of Mailing Written Opinion Jun. 29, 2010, 2 pgs.

* cited by examiner

*Primary Examiner* — Zarni Maung

(57) ABSTRACT

Provided are computer-implemented methods and systems for performing media resource storage and management. The computer-implemented method and system implemented as a request manager is capable of monitoring requests for media resources in a content delivery network. For each monitored request, the request manager determines whether to generate a multifile for the requested media resource. For example, the request manager can first determine whether the media resource is eligible for multifile generation. If eligible, the request manager then determines whether the media resource has reached a popularity threshold. If the media resource has reached the popularity threshold, the request manager initiates generation of the multifile for the requested media resource. Generally, the generated multifile is stored in a storage system associated with the content delivery network.

18 Claims, 10 Drawing Sheets

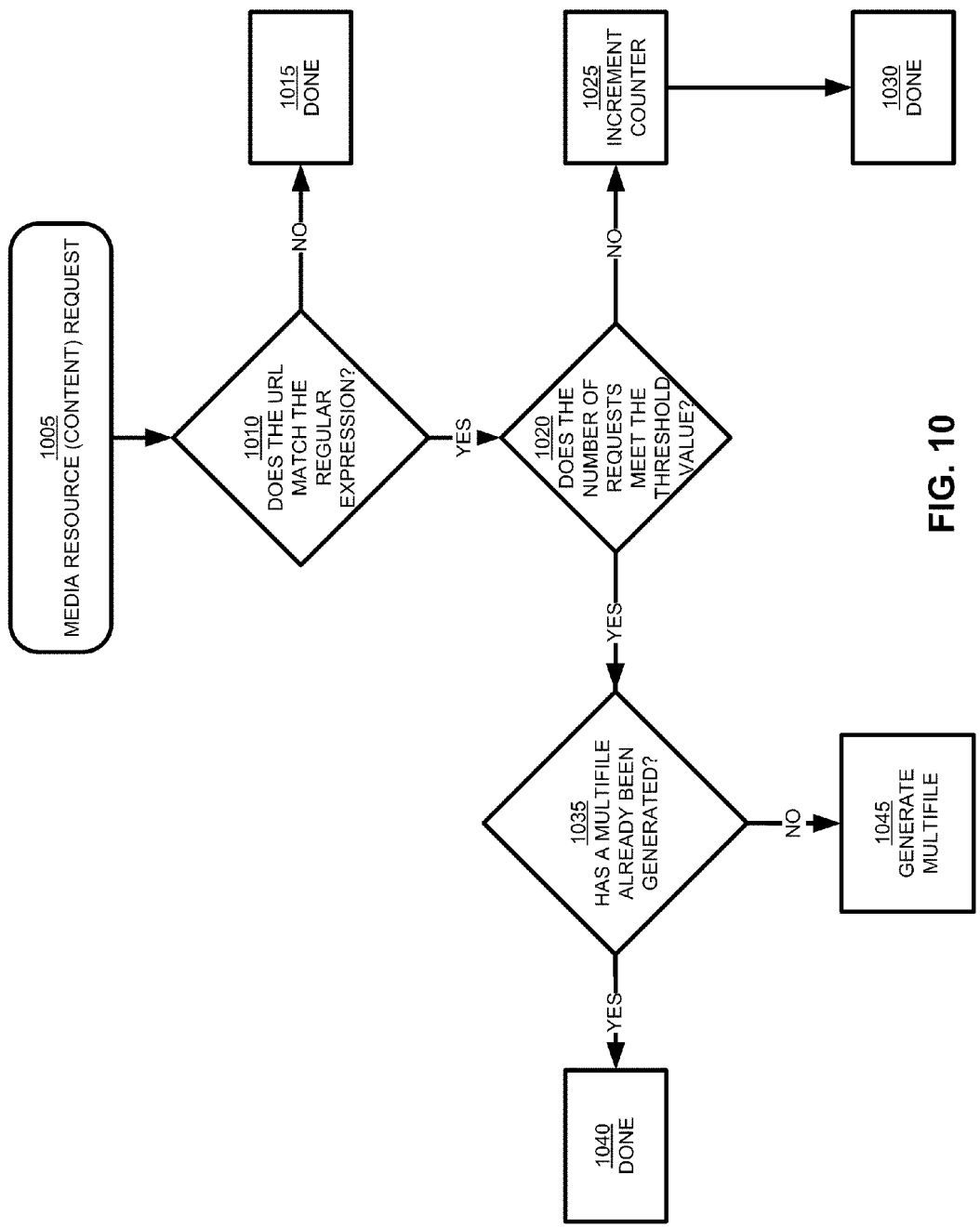

MEDIA RESOURCE STORAGE AND MANAGEMENT

RELATED APPLICATIONS

This application claims the benefit of commonly owned U.S. Provisional Application No. 61/172,638, filed Apr. 24, 2009, entitled "Media Resource Storage and Management," which is incorporated by reference in its entirety for all purposes.

BACKGROUND OF THE INVENTION

Conventional operating systems and file systems typically do not store sets of smaller files in a sequential manner on disk storage. Thus, if storage of related small files is spread over various sectors and/or tracks of a disk or platter, retrieval of the related small files may require many onerous seek operations by the disk head to situate itself over the correct sectors and/or tracks where the data is located. If the file system or operating system that manages disk storage does not recognize the small files as being related, then the file system or operating system will likely spread the portions across the disk according to an optimal storage algorithm for storing smaller files. However, such non-sequential storage can potentially cause a new random access (e.g., head seek+ rotational positioning) or discrete operation (e.g., file open) per each small file that is retrieved.

SUMMARY OF THE INVENTION

Embodiments generally disclosed herein include computer-implemented methods and systems for performing media resource storage and management. The computer-implemented methods and systems, implemented as a request manager in one example embodiment, are capable of monitoring requests for media resources (e.g., in a content delivery network). For each monitored request, the request manager determines whether to generate a multifile for the requested media resource. For example, the request manager can first determine whether the media resource is eligible for multifile generation. If eligible, the request manager then determines whether the media resource has reached a popularity threshold. If the media resource has reached the popularity threshold, the request manager initiates generation of the multifile for the requested media resource. Generally, the generated multifile is stored in a storage system (e.g., disk-based storage) associated with the content delivery network.

Further embodiments disclosed herein include computer-implemented methods and systems for reducing disk read time in a cache server. The computer-implemented methods and systems, implemented as a request manager according to one example embodiment, are capable of iteratively requesting resources (e.g., media objects such as video, images, web pages, etc.) to be grouped into a common file (or multifile) at the cache server. The request manager builds the common file as a contiguous grouping of the requested resources. Additionally, the request manager can initiate at least part of the common file to be served (e.g., to an end user that requested the resources) by reading at least some of the requested resources from the common file in a contiguous manner. Accordingly, the contiguous nature of the common file causes the requested resources to be read from a disk associated with the cache server in a more efficient manner than if the requested resources were stored on the disk as independent files.

BRIEF DESCRIPTION OF DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 10 is a flow chart that shows processing operations performed by a request manager in accordance with an example embodiment.

Throughout the drawing figures, like reference numerals will be understood to refer to like parts and components.

DETAILED DESCRIPTION

Figure 1:
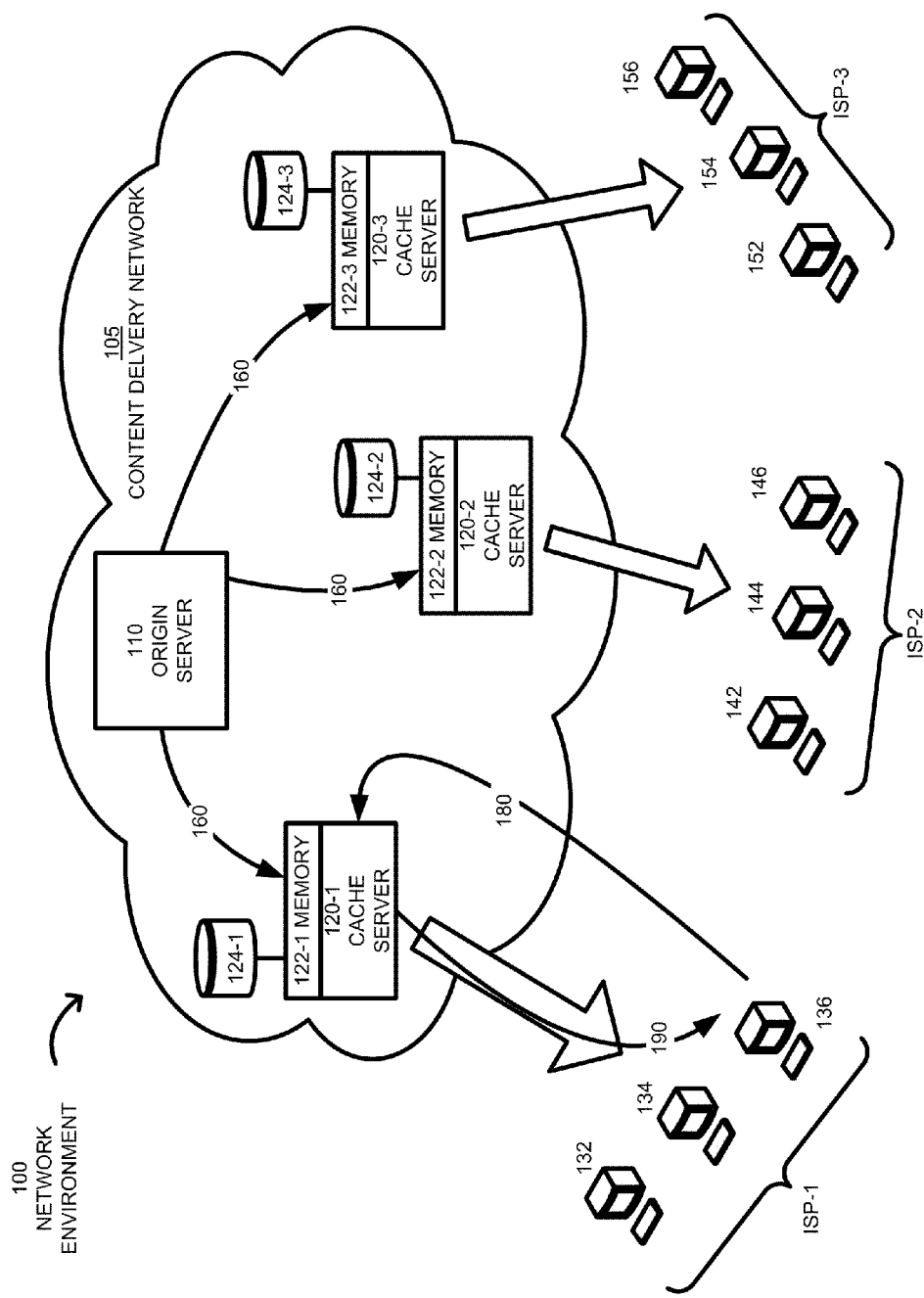
FIG. 1 is a block diagram of a network environment for media resource storage and management in accordance with an example embodiment.

Generally, embodiments disclosed herein provide for improved methods and systems for media resource storage and management. In particular, the methods and systems described throughout the specification relate to identifying media objects (e.g., digital music, movies, web content, software, etc.) that are suitable for multifile generation. A media object typically comprises many related resources. For example, a media object may be a video segmented into many smaller video portions—each smaller video portion may further have a distinct Uniform Resource Locator "URL" associated therewith. Another example of a media object could include a web page (e.g., a Hypertext Markup Language "HTML" page) that comprises many images and/or logos. Similarly, the related resources of the web page (i.e., images/logos in this example) can each have a distinct URL associated therewith.

According to embodiments described further below, media objects suitable for multifile generation typically meet two requirements: 1) eligibility (e.g., a media object composed of many smaller related resources that have a high likelihood of eventually being requested), and 2) popularity of the media object (or the resources contained therein). Such improvements will become apparent in the discussion of the embodiments and related figures below.

Generally, a multifile is a single entry in the cache which contains multiple related files. In one implementation, a multifile contains smaller files in substantially the same order in which they are likely to be requested. Similarly, the generation of multifiles can perform a type of pre-fetching function by retrieving resources that have not yet been requested but have a high likelihood that they will be requested at some point in the future. As such, two particular advantages of building and serving multifiles include:

1) enabling loading of multiple related resources from disk using fewer operations (file opens, disk reads) than would be required to load the related resources individually. In particular, having multiple resources in a single large file enables the cache to perform more efficiently than with small (unrelated) files.

2) keeping related data close together on disk, thereby limiting the seek overhead required to load the resources, even when multiple operations are required to do so.

Multifiles are especially useful when the related resources are relatively small and when the request profile is such that many resources are simultaneously popular, thereby preventing the cache from being able to maintain all the resources in memory. By enabling the retrieval of the resources from disk using fewer, more efficient operations, and by keeping the related data close together on disk, performance is still improved even when the cache is limited by the underlying storage system (e.g., the cache is running disk-bound).

Furthermore, the administration of multifiles can be performed at the application level, thus providing an abstraction from any underlying file systems and/or operating systems and their associated memory management regimes.

One such example of a large media object comprised of many smaller resources is digital video. Since digital video playback can have varying resolutions (e.g., the higher the resolution, the higher the bandwidth required), a single video object can have a range of resolutions from which a user or software application can choose. Thus, for example, during playback of a video being streamed to an end user's computer, a playback application executing on the user's computer can dynamically adjust the resolution of the video in response to changes detected in the streaming bandwidth. To accomplish this, content providers create different resolutions for the video object and then break each of these different resolutions into smaller resources (e.g., two-second portions). The smaller the granularity of the portions, the less an end user will notice the effects of bandwidth fluctuation. For example, assume that a digital video has five different resolutions and, thus, five different videos for the same content (i.e., one being the lowest resolution requiring the least amount of bandwidth). Further assume that each of the five different videos resolutions is broken into smaller sequentially related resources ranging from 1-100 (e.g., each having a distinct URL). Suppose that while the video is being streamed to an end user using the fifth and highest resolution, the bandwidth degrades during playback of portions 44 and 45. In such a case, the playback application can detect this decrease in bandwidth and request video resources associated with the lower, say, fourth resolution to be streamed to the end user. In response to the request for lower resolution video, the playback application would then receive portions 46, 47, . . . , etc., associated with the fourth and lower resolution to accommodate for this fluctuation in bandwidth.

It is therefore beneficial to generate/create multifiles that store multi-resolution large video objects made up of many smaller resources in a sequential manner in disk storage. In particular, if a requested video object is not already in memory, multifiles can be quickly and efficiently retrieved from disk storage and served to end users and/or loaded into cache. Furthermore, in a multi-tiered content delivery environment, multifiles stored on origin servers and/or intermediate servers can be transferred and distributed more efficiently to downstream cache servers. Likewise, servers can transfer multifiles among peers.

It should be noted that multifiles do not necessarily have to contain files that are sequentially ordered. As long as resources are related in some fashion and are likely to be proximately requested because of this relationship, then storing these resources as small files in a single multifile provides for increased disk-read efficiency because of the convenient proximity of the multifile stored on the disk. Moreover, the relationship among the resources enables a type of pre-fetching functionality in that a cache server can retrieve known related resources prior to being requested.

Now, more specifically, FIG. 1 is a block diagram of a network environment 100 having a content delivery network 105 that includes an origin server 110, cache server 120-1, cache server 120-2 and cache server 120-3 (hereinafter collectively cache server 120). Each cache server 120 has a respective memory 122-1, 122-2, and 122-3, and a respective storage system 124-1, 124-2, and 124-3 (e.g., disk-based storage). Cache server 120-1 services requests and provides content to end users 132, 134, and 136 (e.g., client computers) associated with Internet Service Provider 1 (ISP1), cache server 120-2 services requests and provides content to end users 142, 144, and 146 associated with ISP2, and cache server 120-3 services requests and provides content to end users 152, 154, and 156 associated with ISP3.

The network environment 100 in FIG. 1 portrays a high level implementation of content delivery network 105 suitable for implementing and facilitating functionality of the various embodiments described herein. Content delivery network 105 represents just one example implementation of a content delivery network and, as such, it should be noted that the embodiments described herein are similarly applicable for being implemented in any content delivery network configuration commonly practiced in the art. However, it should further be noted that embodiments described herein can be implemented with respect to stand-alone content or origin servers that are not necessarily associated with a content delivery network.

During general operation, the origin server 110 distributes various content and media objects (e.g., depending on geography, popularity, etc.) to cache server 120 as shown by lines 160. Assume, for example, that end user 136 requests certain content (e.g., music, video, software, etc.) that is stored on the origin server 110. Since the origin server 110 has already distributed the requested content to cache server 120-1 (e.g., cache server 120-1 is optimally configured/located to deliver content to end users in ISP1), the end user 136 is redirected using any number of known methods to instead request the content from cache server 120-1. The cache server 120-1 can be selected from the group of cache servers 120 using any number of policies (e.g., load balancing, location, network topology, network performance, etc.). End user 136 then requests the content from cache server 120-1 as shown by line 180. Cache server 120-1 then serves the content to end user 136 (line 190) either from memory 122-1 or, if the content is not in memory, from storage system 124-1.

Embodiments herein generally relate to methods and systems associated with functionality at the cache servers 120 as described further below with respect to FIG. 2-10.

Figure 2:
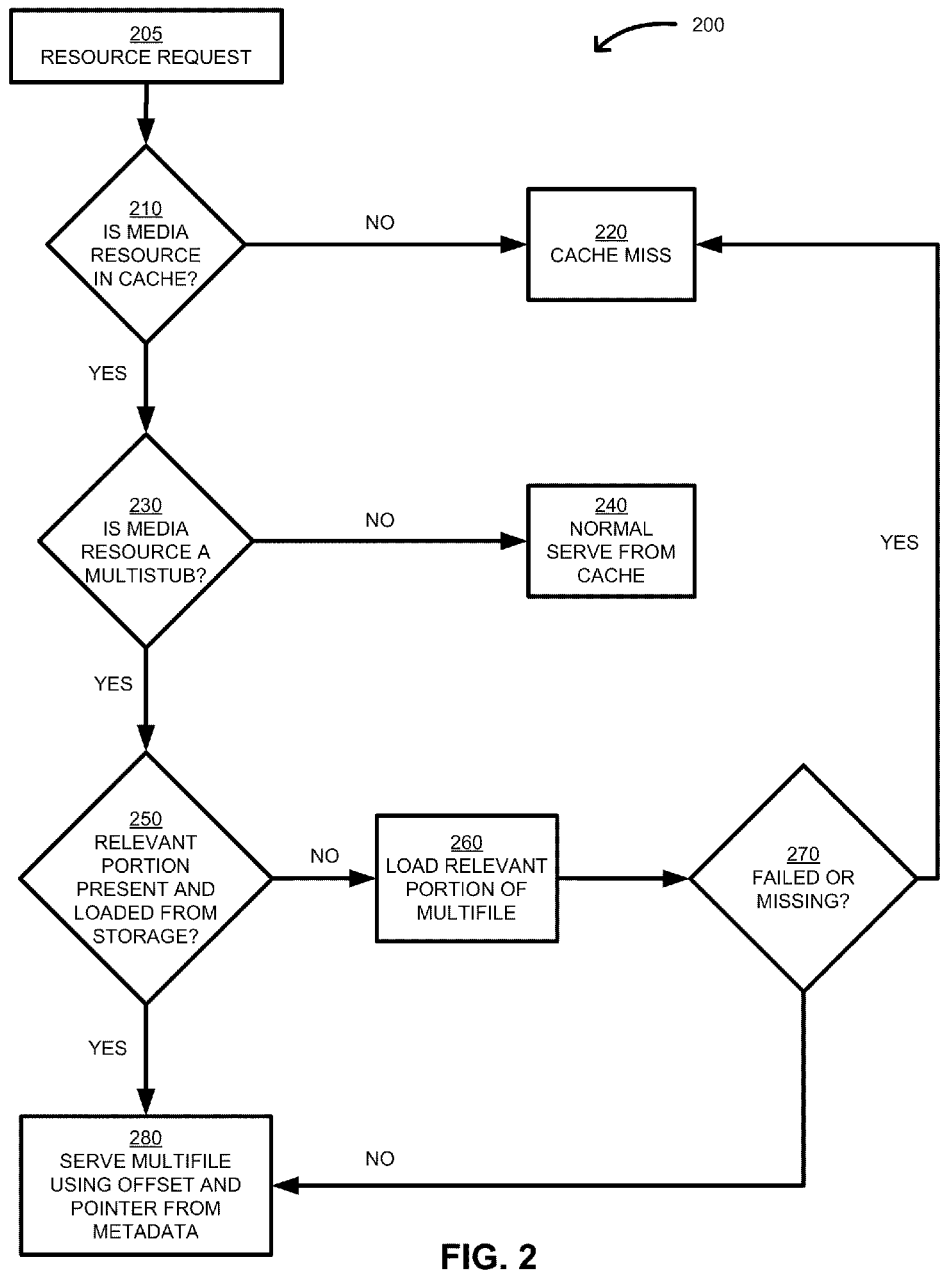
FIG. 2 is a flow chart that shows processing operations associated with serving multifiles in accordance with an example embodiment.

FIG. 2 is a flowchart 200 that shows processing operations related to serving multifiles from a cache server (e.g., in a content delivery network) according to one example embodiment.

Assume for this example embodiment that a resource request (e.g., for video, audio, web page, etc.) originating from an end user is received at the cache server (step 205).

Referring to FIG. 2, in step 210 a process executing in the cache server (e.g., request manager 550 described in more detail below) determines whether the resource is in cache. If not, then the request is treated as a cache miss as shown in step 220 and is handled accordingly. If the resource is determined to be in cache, then processing proceeds to step 230. In step 230, the process determines whether the requested resource is stored in cache as part of a multifile (or, as described below, it is determined whether the requested resource is associated with a multistub). For example, the process can make this determination by checking metadata contained within a multistub associated with the requested resource. According to one embodiment, a multistub is a data entity in the cache index that contains various metadata related to a particular file (associated with the requested resource) within a particular multifile. The metadata can include a pointer to the given multifile in cache, an offset within the multifile where the particular file is located, the size of the file within the multifile, and so on. Furthermore, in another example embodiment resource-specific metadata can be split between a multistub entry and data within the multifile itself. In such a configuration, the multistub metadata includes the resource size but the resource data within the multifile includes the HTTP headers to be served for that particular resource.

Returning to the processing of FIG. 2, if the resource is determined not to be part of a multifile, then the resource is served normally from cache in accordance with commonly known procedures and policies (step 240). If the resource is determined to be part of a multifile, then processing proceeds to step 250.

In step 250, the process determines whether the relevant portion of the multifile, i.e., the portion comprising the requested resource, has been loaded into memory from storage. If so, processing proceeds immediately to step 280. If not, the process attempts to load the relevant portion of the multifile per step 260. It is possible that this step may fail for various reasons (e.g., missing or corrupted multifile), in which case the request is treated as a cache miss as indicated by the decision in step 270 and the action in step 220. If the loading of the relevant portion of the multifile succeeds, processing proceeds to step 280. Note that loading the relevant portion will likely cause subsequent portions to be loaded as well due to read-ahead policies of the underlying storage mechanism well known in the art, and further enabled by the conveniently proximate nature of the data in storage.

In step 280, the process serves the resource from the relevant portion of the loaded multifile (e.g., using the offset and size values found in the associated multistub metadata). Note that it is possible that the relevant portion may already have been loaded into memory as part of the operation performed to load the portion required to satisfy the prior request or requests, as previously described, and due to the expected sequential nature of such requests. In this way, the process of serving the media object as a whole is made more efficient (even when the object is being requested by a single client), since more than one individual resource comprising the media object can be loaded in a single operation.

Figure 3:
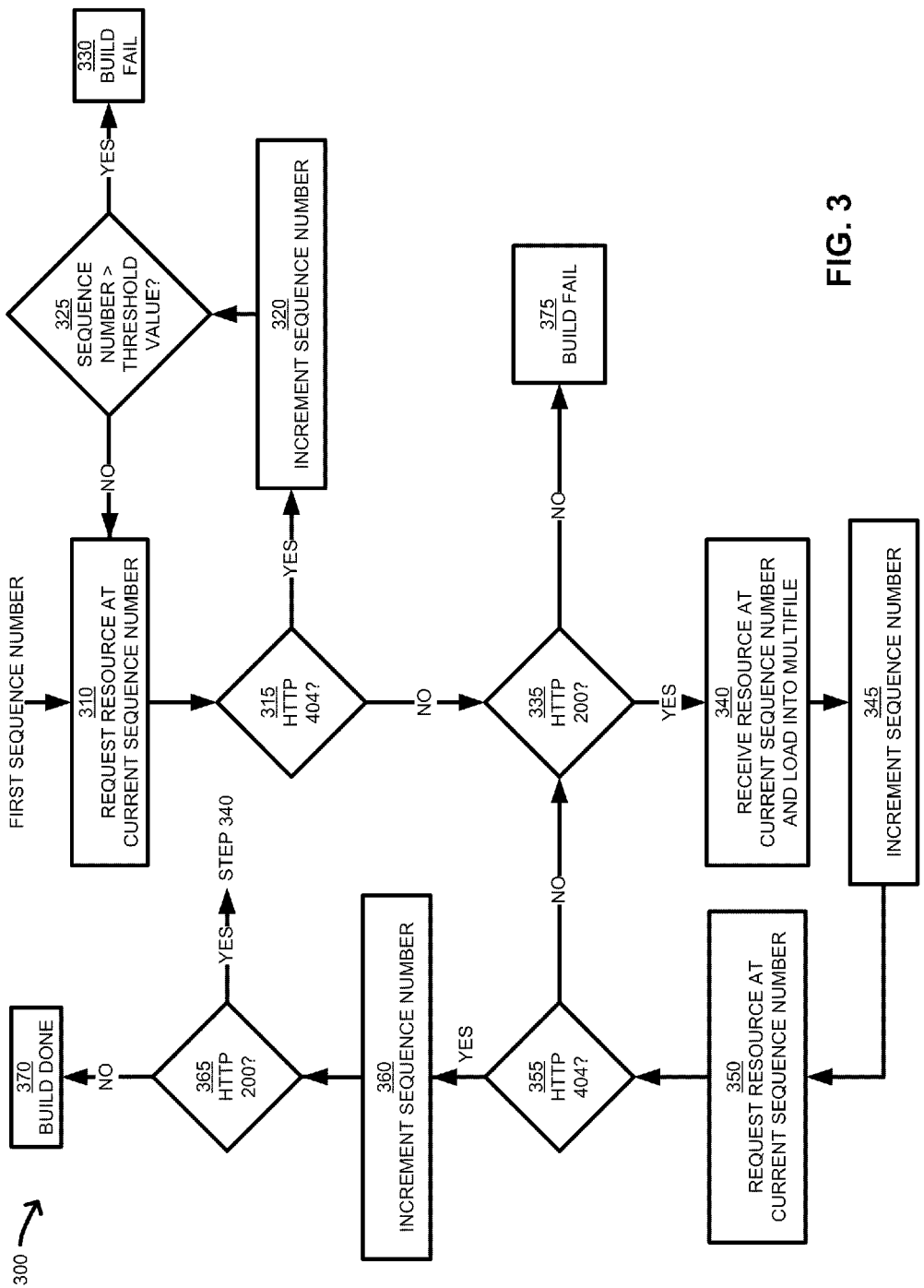
FIG. 3 is a flow chart that shows processing operations associated with building multifiles in accordance with an example embodiment.

FIG. 3 is a flowchart 300 that shows processing operations related to an example multifile building process in a cache server according to one example embodiment. Note that any reference made to an origin server below is also meant to include intermediate content servers that may reside between the cache server and the origin server (e.g., in a content delivery network).

Initially, at step 310, a cache server process (e.g., request manager 550 as described further below) finds the first valid resource of the sequence in the origin server by starting at and requesting the specified first sequence number (or 0 if not specified) and then analyzes the response code returned by the origin server (e.g., Hypertext Transfer Protocol "HTTP" 404 response code). For example, HTTP 404 response codes encountered in this state cause the process to iteratively find the next sequence number until a successful response code is returned (e.g., HTTP 200 status code) or a threshold sequence number (e.g., default 10) is reached (steps 315, 320 and 325). For instance, if no HTTP 200 status code is encountered after requesting resources within the threshold range (e.g., by the $10^{th}$ iteration if the threshold sequence number is 10), then the build fails (step 330).

Once the first resource is found (HTTP 200 status code returned, step 335), the process begins to build a multifile by issuing requests to the origin server for sequential sequence numbers (steps 340, 345 and 350) until an HTTP 404 response code is encountered (step 355). Specifically, in step 340, the resource received for the current sequence number is loaded into the multifile. Typically, the build is complete when it is determined in step 355 that an HTTP 404 response code is returned, whereby processing proceeds to step 370 (intermediate steps 360 and 365 are described further below with respect to an example scenario that may arise during execution of the build). If neither an HTTP 404 (at steps 315 and 355) nor an HTTP 200 (step 335) response/status code is returned, the build fails (step 375).

It should be noted that an entire media object does not necessarily have to be built into a single multifile. In other words, a series of multifiles may be built for a single media object. From a serving perspective, having a series of multifiles for a single media object is nearly as efficient as serving from a single multifile. Other advantages of using a series of multifiles for a single media object include allowing the media object to be stored across multiple disks and potentially limiting the rebuild work necessary if a multifile becomes damaged, part of the multifile becomes out-of-date, etc.

Thus, considering that more than one multifile may be built for a single media object, and referring again to the example flowchart 300 of FIG. 3, assume that after it is determined that an HTTP 200 status code is returned (step 335), a further step then determines whether the current multifile is at or beyond the target multifile size. If not, processing continues to step 340. However, if the multifile is at or beyond its target size, a new multifile would have to be created (although related to the previous multifile(s) if the build process is still loading for the same media object) before processing proceeds to step 340.

An example complication can arise when a resource is temporarily missing on the origin server (e.g., an HTTP 404 response code is returned at step 355 even though resources with higher sequence numbers are available). In such a scenario, and according to an example embodiment, the build process proceeds through at least the sequence number corresponding to the request which started the build. Even if the build was triggered by a request for a lower sequence number, after an HTTP 404 response code is encountered (at step 355), the process checks the cache to determine whether the resource with the next sequence number is already present (steps 360 and 365, that is, if the request for the resource at the next incremented sequence number returns an HTTP 200 status code). If so, the HTTP 404 response code from step 355 is considered to be a missing resource and the build continues using the next sequence number (processing returns to step 340 from step 365). Note that in this particular example the resource at the next sequence number (i.e., the sequence number subsequent to the sequence number associated with the missing resource) is stored/loaded in the multifile where the previous missing resource would have been stored/loaded.

It should be further noted that, at least in this example embodiment, only the cache is checked. In other words, no particular confirmation request is made to the origin server as this condition is considered unusual and is generally not worth the expense of contacting the origin server to confirm that the build is done, especially since the origin server was just recently contacted with a request for the previous sequence number. However, in some circumstances, the build process may additionally query the origin server for the missing resource after unsuccessfully checking in the cache.

Another example complication may arise when some multifile entries have expired and are then subsequently reloaded. Such a reload will essentially reclassify the resource as a normal cache entry (i.e., not as part of a multifile) and, thus, the build operation will be restarted when the requests for the reloaded resource(s) equal or exceed the desired popularity threshold (i.e., the hit count reaches the target or trigger value).

An additional complication may arise when the cache server was shut down (intentionally or unintentionally) while in the process of building one or more multifiles. In this case, there may be entries in the cache which have not yet been completely built, or there may entries which belong in multifiles but have not yet made it into the cache. After the cache server starts again, if those entries (either existing ones or newly loaded ones) receive enough hits (i.e., reach the desired popularity), then the build operation is restarted per the embodiments described herein.

Yet another example complication may arise when the reloaded or not-yet-built entries are not immediately built into multifiles. As previously noted, these entries have their hit counts incremented as requests are made and, then, when the trigger value is reached, the build operation restarts. Such an operation may then encounter already-built multifiles as it proceeds. In such a scenario, and according to one embodiment, a determination should be made whether to rebuild resources from the existing multifile or, instead, skip over the existing multifile and restart the process at the next sequence number after the existing multifile (which, of course, may also be the start of another multifile).

The following example embodiment describes the processing (from the previous example) for determining whether to rebuild resources from the existing multifile or skip over the existing multifile and restart the build at the next sequence number. For instance, if the multifile being built has not reached a given threshold size, say, ¾ of its target size, then entries from the existing (complete) multifile are rebuilt. This typically results in a rebuild of all the subsequent entries. Such a rebuild tends to keep multifiles optimally sized (i.e., at a target size) at the expense of some redundant disk activity.

Continuing with the above example, and still assuming the multifile being built has reached the given threshold size (e.g., at least ¾ of its target size), the processing then verifies that every entry in the cache for the range of sequence numbers that the multifile encompasses is, in fact, a multistub which references that multifile. Then, assuming that the encountered multifile is properly verified, the multifile is skipped over and the build process resumes at the next sequence number. It is possible that resources will fall out of the cache and be reloaded while the encountered multifile is being verified. If this happens, the build process will start again once the associated trigger value (i.e., popularity threshold) has been reached. Unless resources are expiring very quickly (or the cache is thrashing), this situation should typically resolve itself within a few iterations.

Still yet another example complication can occur when various errors are encountered during the build process. Such errors can include, by non-limiting example: disk read failures (while reading cache contents), disk write failures (while building multifiles), resources being aborted while they are being built (fill failures), and receipt of a bad HTTP status code (e.g., HTTP 503 status code if the origin server cannot be reached). If such errors are encountered before any of the data for an entry has been added to the multifile, the operation is simply retried (e.g., to avoid thrashing). If too many errors are encountered, the build is terminated. Then, if resources that have not been built continue to get hits/requests and the threshold popularity is reached, the build operation is restarted at a later time (although, in some circumstances, this particular build is moved to the end of the queue), thus skipping over already-built multifiles as described above.

Furthermore, if an error is encountered while an entry is being appended to a multifile, the multifile is typically abandoned and released and the process restarts at the first sequence number in the abandoned multifile. In another example embodiment, the process truncates the multifile at its last known 'good' offset and then restarts at that point.

In another example scenario, if the multifile entry being constructed experiences a disk write failure, the infirm multifile is released and the process is restarted at the sequence number at the beginning of that multifile.

It should be noted that although the example embodiments associated with FIG. 3 have been described in the context of sequentially ordered resources, it is contemplated to be within the scope of this invention that the embodiments and implementations described herein are also applicable to related resources that are not necessarily ordered in a sequential manner. For example, instead of incrementing a sequence number as described with respect to FIG. 3, the processing may request related content based on content type (e.g., iteratively request another image resource associated with an HTML web page until all the related images have been loaded into a multifile). Other types of resource relationships that may be suitable for multifile generation include, for example, related transmission types (e.g., HTTP, RTSP, etc.), related compression types (WMV, JPEG, MP3, etc.), and so on.

Figure 4:
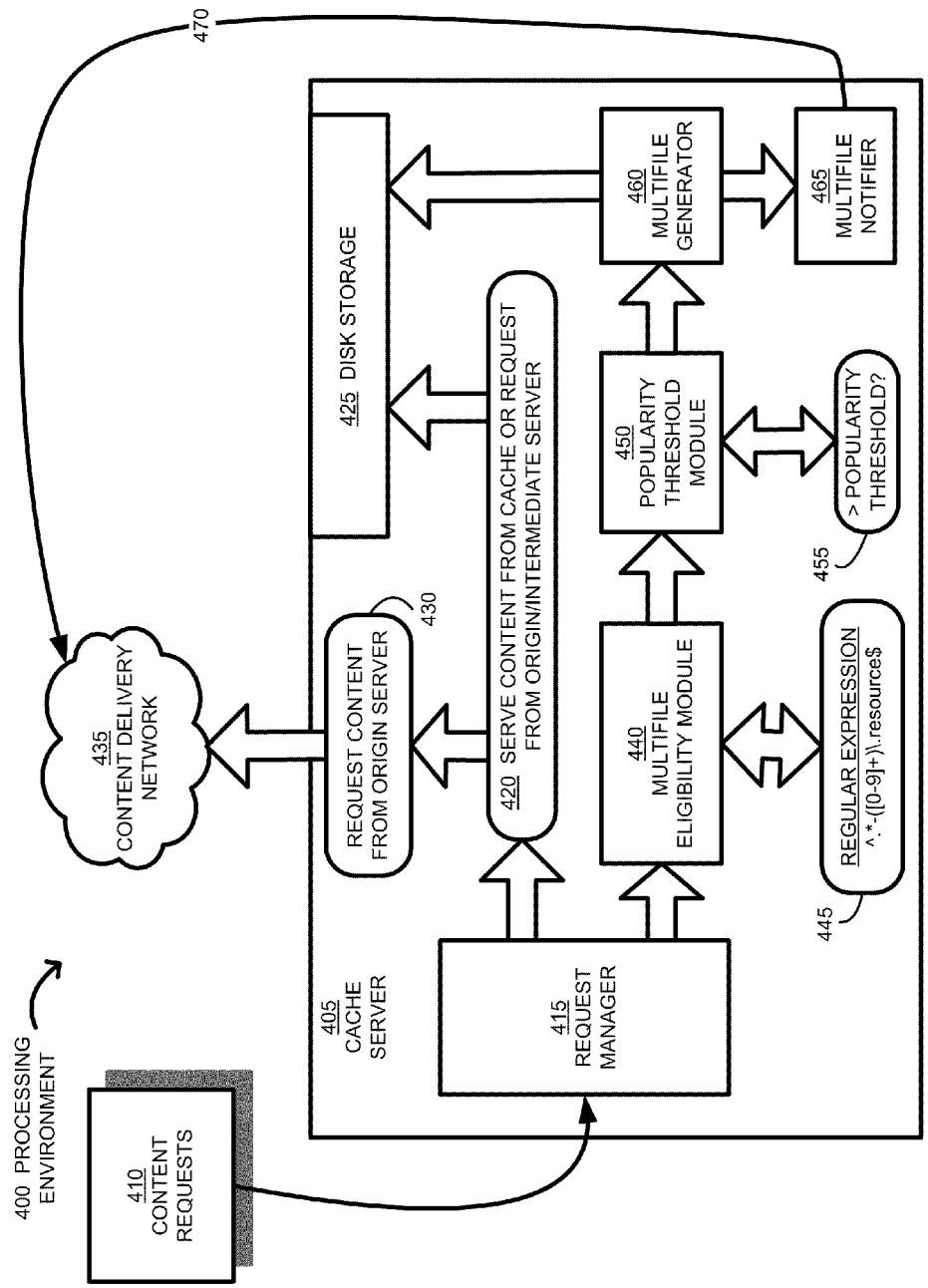
FIG. 4 is a block diagram of a processing configuration for media resource storage and management in accordance with an example embodiment.

FIG. 4 is a block diagram of a processing environment 400 that shows functionality of a cache server 405. During general operation, the cache server 405 receives content requests (i.e., requests for media objects such as video, audio, web content, games, etc.) and processes these requests at the request manager 415.

On one hand, the request manager 415 processes the request 410 to ultimately deliver the requested content to an end user(s). This is shown by processing step 420. The cache server 405 serves the content from the local disk storage 425 if the content is already loaded into the cache. If not, the cache server 405 retrieves the content from an origin or intermediate content server via content delivery network 435 and then serves the content to the end user. According to one example embodiment, the content retrieved from the origin or upstream server is additionally stored in the cache memory system 425 and/or the disk storage system 430 depending on various conditions.

In another embodiment, the request manager 415 processes the content request 410 for potential multifile generation. This processing may be performed prior to, during, or subsequent to serving the requested content to the end user as described above.

Initially, the request manager 415 passes the request to the multifile eligibility module 440. The multifile eligibility module 440 analyzes a Uniform Resource Locator (URL) associated with the content request 410 against a regular expression (or any other well-known syntactical and/or grammatical tool useful for identifying strings of text of interest, such as particular characters, words, or patterns of characters).

According to one example embodiment, and referring back to the previous example, the regular expression parses a content request's URL into four components: i) base name, ii) sequence number, iii) prefix, and iv) suffix. The base name is the portion of the URL which is invariant across related resources (e.g., resources having the same content but different resolutions), and is constructed from the entire URL not including whichever portion matches the sequence number portion. The sequence number portion of the URL contains sequencing information associated with the portions of the larger media object. The prefix portion of the URL appears before the sequence number portion—and, this may be an empty set. The suffix portion of the URL appears after the sequence number portion.

For example, the following regular expression can be used to parse incoming URLs associated with requests for media resources:

Regular Expression: ^.*-([0-9]+)\.resource$

URLs: /type1-1.resource
/type1-2.resource
/type1-3.resource

Note that only a single sub-expression, to match/extract the sequence number portion of the URL, is required. However, multiple sub-expressions may be used if needed. This serves not only to parse the resource name into the component parts (i.e., base name, sequence number, prefix, and suffix), but also to filter out resources which are not multifile enabled (by not matching the regular expression). For the example above, the base name is "/type1-.resource", the sequence number portion is the number following the "-", the prefix is "/type1-" and the suffix is ".resource".

If the multifile eligibility module 440 determines that the URL associated with the content request matches the regular expression, then, according to one example embodiment, the resource associated with the resource request is deemed eligible for multifile generation or building. Note that when a resource is deemed 'eligible' it does not necessarily mean that a multifile will be generated for the eligible resource. If the URL does not match the regular expression (or the multifile eligibility module 440 deems the requested resource ineligible for some other reason), then the multifile processing at the cache server 405 does not proceed—even though the request will still be processed in accordance with normal cache serving procedures and policies per processing step 420.

According to other example embodiment, the multifile eligibility module 440 can use pattern recognition and/or sequence forecasting techniques commonly known in the art to determine the eligibility of media resources for multifile generation. Similarly, multifile eligibility may be determined based on content type such as video versus audio, based on compression format such as MPEG versus WMV, based on transmission protocol such as HTTP versus RTSP, etc., and/or any combination thereof.

After a resource is determined to be eligible for multifile generation, processing is passed to popularity threshold module 450. Since actual multifile generation can require a high expenditure of system resources, particularly that of the disk storage 425, it is important to generate multifiles for only those media objects that are frequently requested (e.g., popular content).

For example, in one embodiment each particular media object (e.g., movie A, movie B, etc.) has an associated request counter that keeps track of how many times that particular media object has been requested. In this manner, the request counter may track the number of content requests that have been received at cache server 405, or the counter may track the aggregate number of content requests that have been received at other cache servers in the content delivery network 435. Once the popularity threshold module 450 receives the content request 410, for instance, it can increment a request counter associated with the particular content or media object associated with the request. If the request counter equals or exceeds the popularity threshold value at processing step 455, then the requested content is deemed to have sufficient popularity to merit generation of an associated multifile. If the request counter does not equal or exceed the threshold value, then the multifile processing at cache server 405 does not proceed. Note that the request counter can be incremented either before or after it is compared with the popularity threshold value at processing step 455.

In another example embodiment, the popularity threshold module 450 combines a temporal component with the number of times a resource has been requested in order to ascertain the popularity of a requested resource. As an example, a media resource may be deemed to have sufficient popularity for multifile generation if at least a threshold number of requests for the requested media resource have occurred within a retrospective time period from when the requested media resource was requested (e.g., determine if media resource A has been requested at least 100 times within the preceding hour from when this latest request for media resource A was received).

If both the requested resource is eligible and has sufficient popularity for multifile generation, then the multifile processing is passed to multifile generator 460. Multifile generator 460 coordinates with the cache server 405 operating system, disk storage 425, and/or origin server (or other intermediate upstream server) to retrieve the necessary data for storage as a multifile on the disk storage 425.

Still referring to FIG. 4, multifile processing can pass from the multifile generator 460 to the multifile notifier 465 according to one example embodiment. The multifile notifier 465 can notify other servers (e.g., peers) in the content delivery network 435 or elsewhere that a multifile is being generated for a particular media resource (e.g., via communication path 470 to content delivery network 435). This may prompt other servers to preemptively generate multifiles for the particular media resource without having to perform the eligibility and/or popularity processing. Additionally, upstream servers (i.e., origin server, intermediate cache/content servers) can notify their downstream cache servers that particular media resources or content can be retrieved in multifile format.

Figure 5:
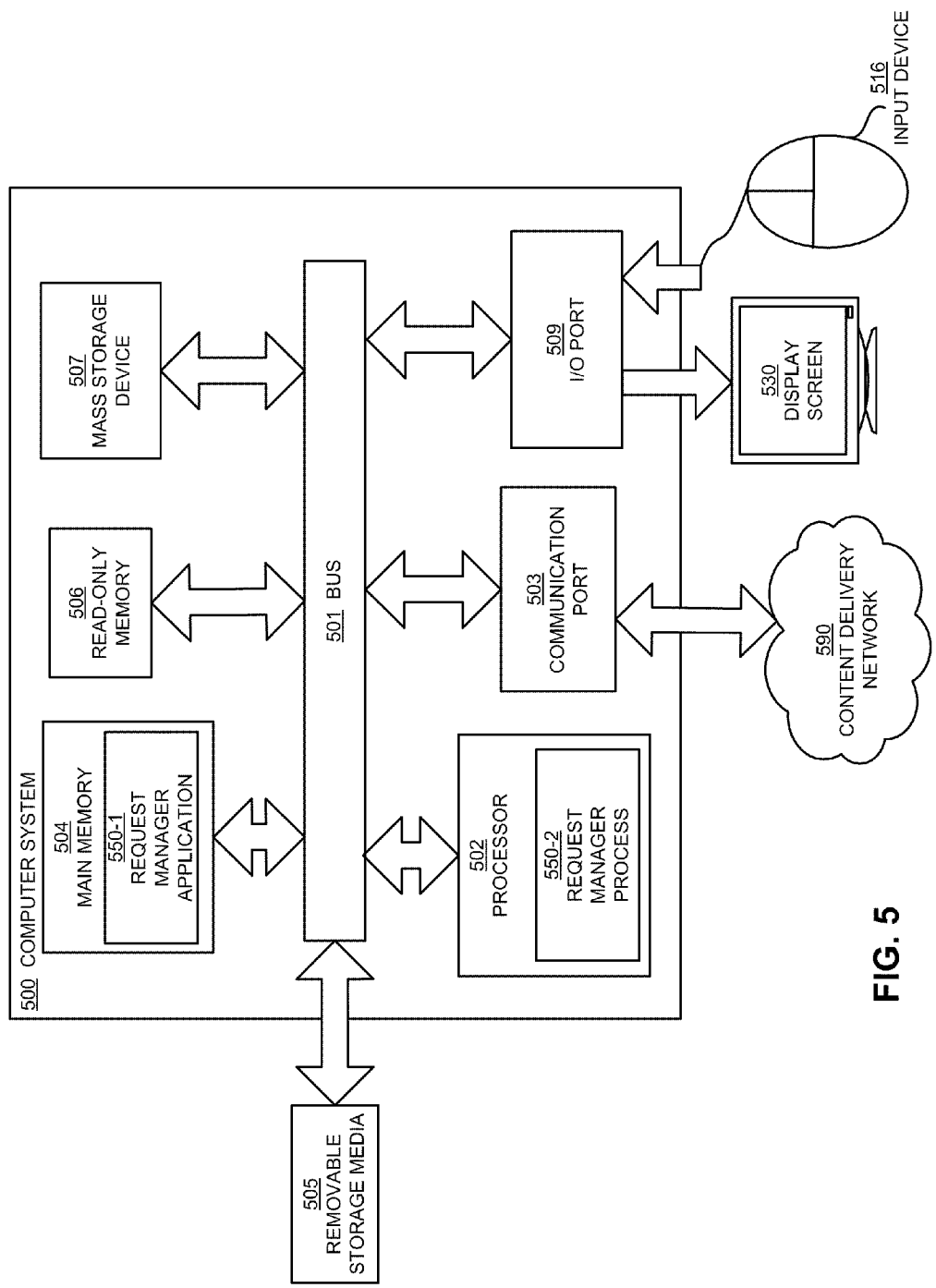
FIG. 5 is a block diagram of a computer system suitable for performing media resource storage and management in accordance with an example embodiment.

FIG. 5 is a schematic diagram of a computer system 500 (e.g., cache server, streaming server, replicating server, etc.) upon which embodiments of the present invention may be carried out and/or implemented.

According to the present example, the computer system 500 includes a bus 501 (i.e., interconnect), at least one processor 502, at least one communications port 503, a main memory 504, a removable storage media 505, a read-only memory 506, and a mass storage 507. Processor(s) 502 can be any known processor. Communications ports 503 can be any of an RS-232 port for use with a modem based dial-up connection, a 10/100 Ethernet port, a Gigabit port using copper or fiber, a USB port, and so on. Communications port(s) 503 may be chosen depending on a network such as a Local Area Network (LAN), a Wide Area Network (WAN), or any network to which the computer system 500 connects (e.g., content delivery network 590). The computer system 500 may be in communication with peripheral devices (e.g., display screen 530, input device 516) via Input/Output (I/O) port 509.

Main memory 504 can be Random Access Memory (RAM), or any other dynamic storage device(s) commonly known in the art. Read-only memory 506 can be any static storage device(s) such as Programmable Read-Only Memory (PROM) chips for storing static information such as instructions for processor 502. Mass storage 507 (e.g., disk storage system) can be used to store information and instructions.

Bus 501 communicatively couples processor(s) 502 with the other memory, storage and communications blocks.

Note that cache systems and disk storage systems discussed throughout this specification can include any one (or any combination) of the memory and/or storage systems previously described, as well as any other memory and/or storage systems commonly used in content delivery networks.

Embodiments herein may be provided as a computer program product, which may include a machine-readable medium having stored thereon instructions, which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 504 is encoded with request manager application 550-1 that supports functionality as discussed above and as discussed further below. Request manager application 550-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 502 accesses main memory 504 via the use of bus 501 in order to launch, run, execute, interpret or otherwise perform the logic instructions of the request manager application 550-1. Execution of request manager application 550-1 produces processing functionality in request manager process 550-2. In other words, the request manager process 550-2 represents one or more portions of the request manager application 550-1 performing within or upon the processor(s) 502 in the computer system 500.

It should be noted that, in addition to the request manager process 550-2 that carries out method operations as discussed herein, other embodiments herein include the request manager application 550-1 itself (i.e., the un-executed or non-performing logic instructions and/or data). The request manager application 550-1 may be stored on a computer readable medium (e.g., a repository) such as a floppy disk, hard disk or in an optical medium. According to other embodiments, the request manager application 550-1 can also be stored in a memory type system such as in firmware, read only memory (ROM), or, as in this example, as executable code within the main memory 504 (e.g., within Random Access Memory or RAM). For example, request manager application 550-1 may also be stored in removable storage media 505, read-only memory 506, and/or mass storage device 507.

In addition to these embodiments, it should also be noted that other embodiments herein include the execution of the request manager application 550-1 in processor(s) 502 as the request manager process 550-2. Thus, those skilled in the art will understand that the computer system 500 can include other processes and/or software and hardware components, such as an operating system that controls allocation and use of hardware resources. As such, the request manager 550 (application 550-1 and process 550-2) may be implemented on the same computerized device 500 (e.g., router, server, etc.) as the same or separately executed processes, or on separate devices in various combinations as the same or separately executed processes. In particular, the modules and processing steps described with respect to FIG. 4, and shown in a logical configuration for purposes of example only, can be implemented as single, separate, or any combination of software and/or hardware processes and applications, and/or be embodied as computer-readable instructions. For example, one or more instances (or instantiations) of the request manager 550 may execute/run in parallel and, for example, each such instance may handle different media objects, disjoint portions of the same media object, and so on.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

FIGS. 6-10 include flowcharts according to embodiments herein. The rectangular elements are herein denoted as "steps" and represent computer software instructions or groups of instructions that carry out such functions. The flow diagrams do not necessarily depict the syntax of any particular programming language. Rather, the flow diagrams illustrate the functional information one of ordinary skill in the art could use to fabricate circuits or to generate computer software (or a hybrid of both circuits and software code) to carry out the features as described herein.

It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 6:
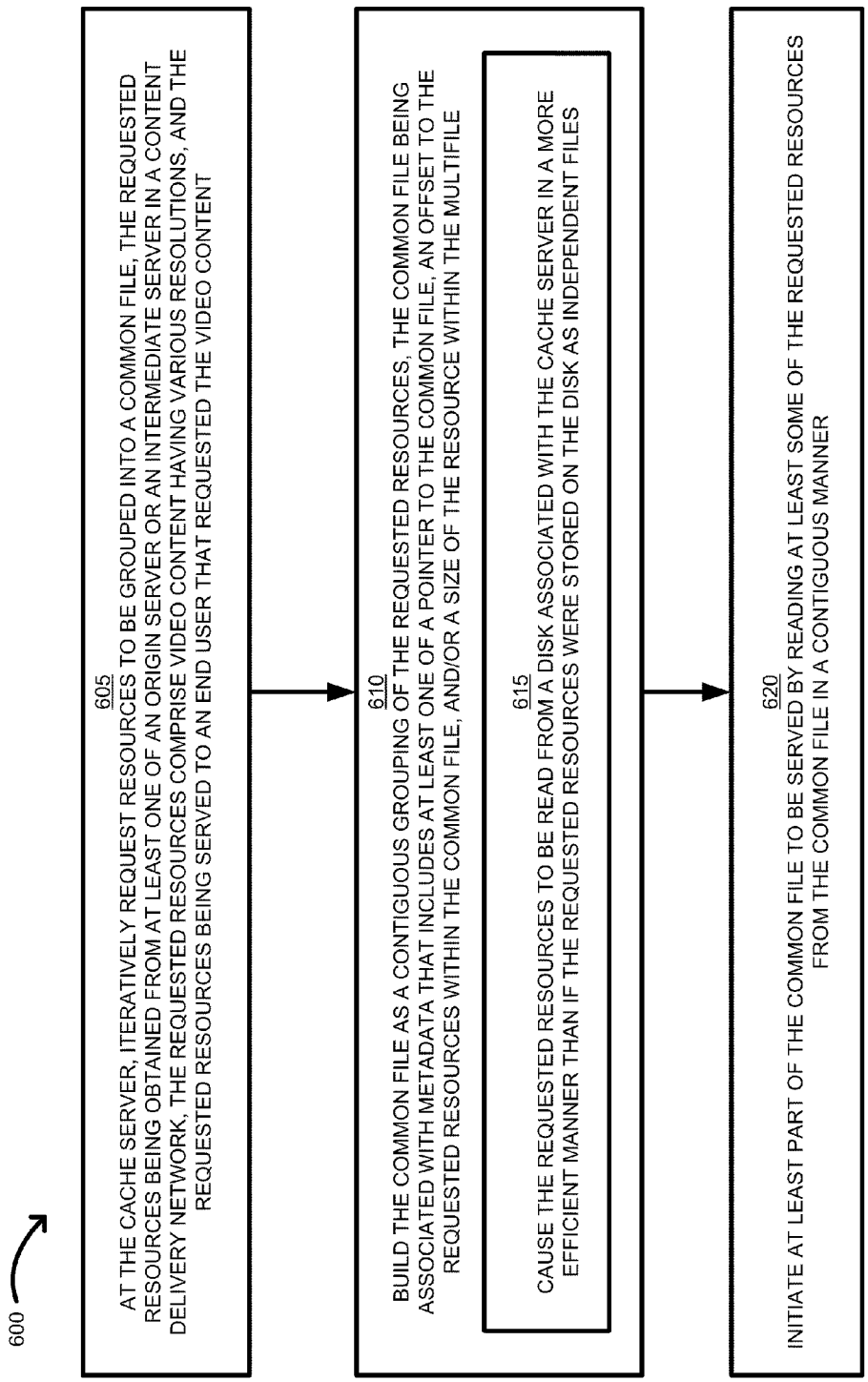
FIG. 6 is a flow chart that shows processing operations performed by a request manager in accordance with an example embodiment.

FIG. 6 is a flow chart 600 of processing steps that shows processing operations performed by the request manager 550 (i.e., request manager application 550-1 and/or the run-time implementation of request manager process 550-2) in accordance with one example embodiment. Note that throughout the discussion of the flow charts, the request manager 550 may perform the same or similar functionality as the resource processing module described below.

In step 605, at the cache server, the request manager 550 iteratively requests resources to be grouped into a common file (i.e., multifile). In one embodiment, the requested resources are obtained from at least one of an origin server or an intermediate server in a content delivery network. According to another embodiment, the requested resources comprise video content having various resolutions, wherein the requested resources are eventually served (initiated by the request manager 550) to an end user that requested the video content.

In step 610, the request manager 550 builds the common file as a contiguous grouping of the requested resources. The resources can be obtained or retrieved, for example, from an origin or intermediate server, a peer server, or from the cache server itself (e.g., from resources already stored locally). Furthermore, in one example embodiment the file is associated with metadata (e.g., in a multistub) that includes at least one of a pointer to the common file, an offset to the requested resources within the common file, and/or a size of the resource within the multifile.

In step 615, by building the common file as a contiguous grouping, the request manager 550 causes the requested resources to be read from a disk associated with the cache server in a more efficient manner (e.g., less disk read time, fewer discrete operations such as file opens, etc.) than if the requested resources were stored on the disk as independent files (i.e., not in a common file or multifile). This processing enables resources to be retrieved from disk using fewer, more efficient operations since the related resources (i.e., sometimes resources that have not even been requested yet) are situated close together on disk.

Similarly, by building the common file (or multifile), the request manager 550 causes some resources to be cached locally before they are ever requested by a client—even if this is the only client currently requesting the media object. Such pre-fetching can lead to significantly improved performance for the client. Such improved performance can especially be appreciated with video content where even small amounts of latency in retrieving an uncached portion of the video content (e.g., example from a slow origin server) may cause a skip or other pause in the video delivery.

In step 620, the request manager 550 initiates at least part of the common file to be served (e.g., to the end user) by reading at least some of the requested resources from the common file in a contiguous manner.

According to an example embodiment, prior to the step of iteratively requesting resources, the request manager 550 determines that the requested resources are eligible to be grouped into a common file when a Uniform Resource Locator (URL) associated with the requested resources matches a regular expression. Furthermore, the step of iteratively requesting resources is initiated after a determination that the requested resources exceed a popularity threshold (e.g., the number of hits equals or exceeds a target, trigger, popularity, etc., value).

Figure 7:
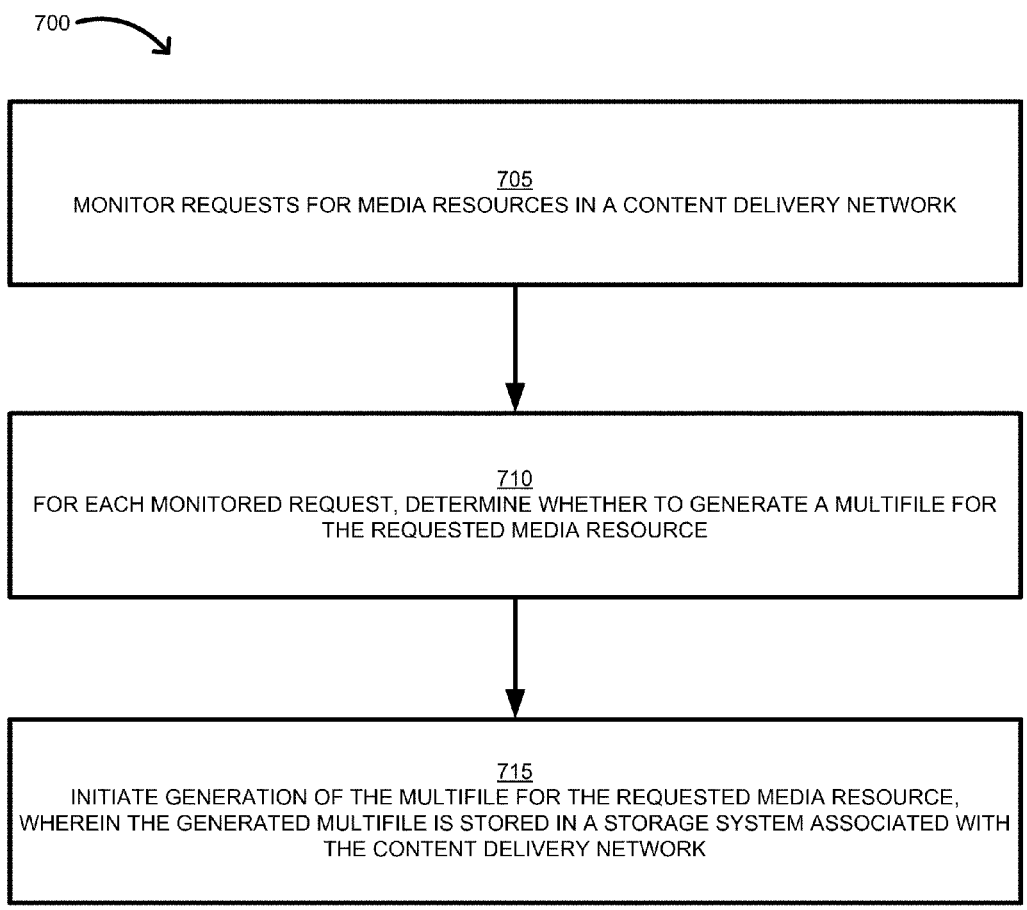
FIG. 7 is a flow chart that shows processing operations performed by a request manager in accordance with an example embodiment.

FIG. 7 is a flow chart 700 of processing steps that shows processing operations performed by the request manager 550 (i.e., resource processing module) in accordance with one example embodiment.

In step 705, the request manager 550 monitors requests for media resources (e.g., content such as music, media, software, web pages, etc.) in a content delivery network (e.g., content delivery network 105).

In step 710, for each monitored request, the request manager 550 determines whether to generate a multifile for the requested media resource. For example, the request manager 550 will not generate (or build) a multifile for a given media resource if a multifile has already been generated for that media resource.

In step 715, the request manager 550 initiates generation of the multifile for the requested media resource. In one example embodiment, the generated multifile is stored in a storage system (e.g., disk-based storage system) associated with the content delivery network.

Figure 8:
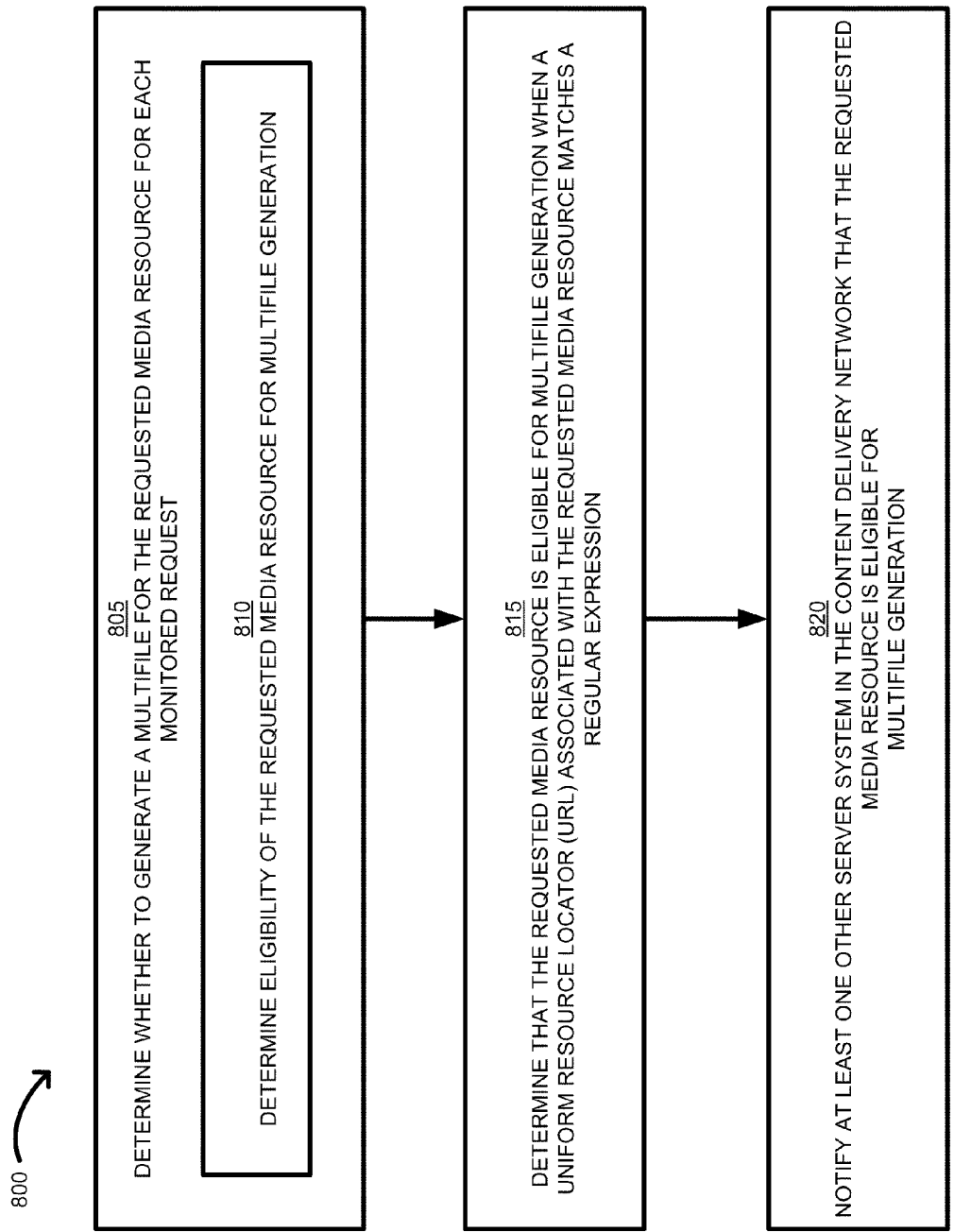
FIG. 8 is a flow chart that shows processing operations performed by a request manager in accordance with an example embodiment.

FIG. 8 is a flow chart 800 of processing steps that shows processing operations performed by the request manager 550 (i.e., resource processing module) in accordance with one example embodiment.

In step 805, for each monitored request, the request manager 550 determines whether to generate a multifile for the requested media resource.

In step 810, the request manager 550 determines eligibility of the requested media resource for multifile generation. It should be noted that the request manager 550 can use pattern recognition and/or sequence forecasting techniques commonly known in the art to determine eligibility of a given media resource.

In step 815, the request manager 550 can determine that the requested media resource is eligible for multifile generation when a Uniform Resource Locator (URL) associated with the requested media resource matches a regular expression.

In step 820, in response to a determination that the requested media resource is eligible for multifile generation, the request manager 550 notifies at least one other server system in the content delivery network that the requested media resource is eligible for multifile generation. For example, the request manager 550 can notify other cache servers (peers) in the content delivery network and/or other upstream servers in the content delivery network such as the origin server. Thus, multifiles may be generated on storage systems both local and remote to the cache server executing the request manager 550 (i.e., resource processor module). This technique can therefore can be implemented in multi-tiered network architectures.

Figure 9:
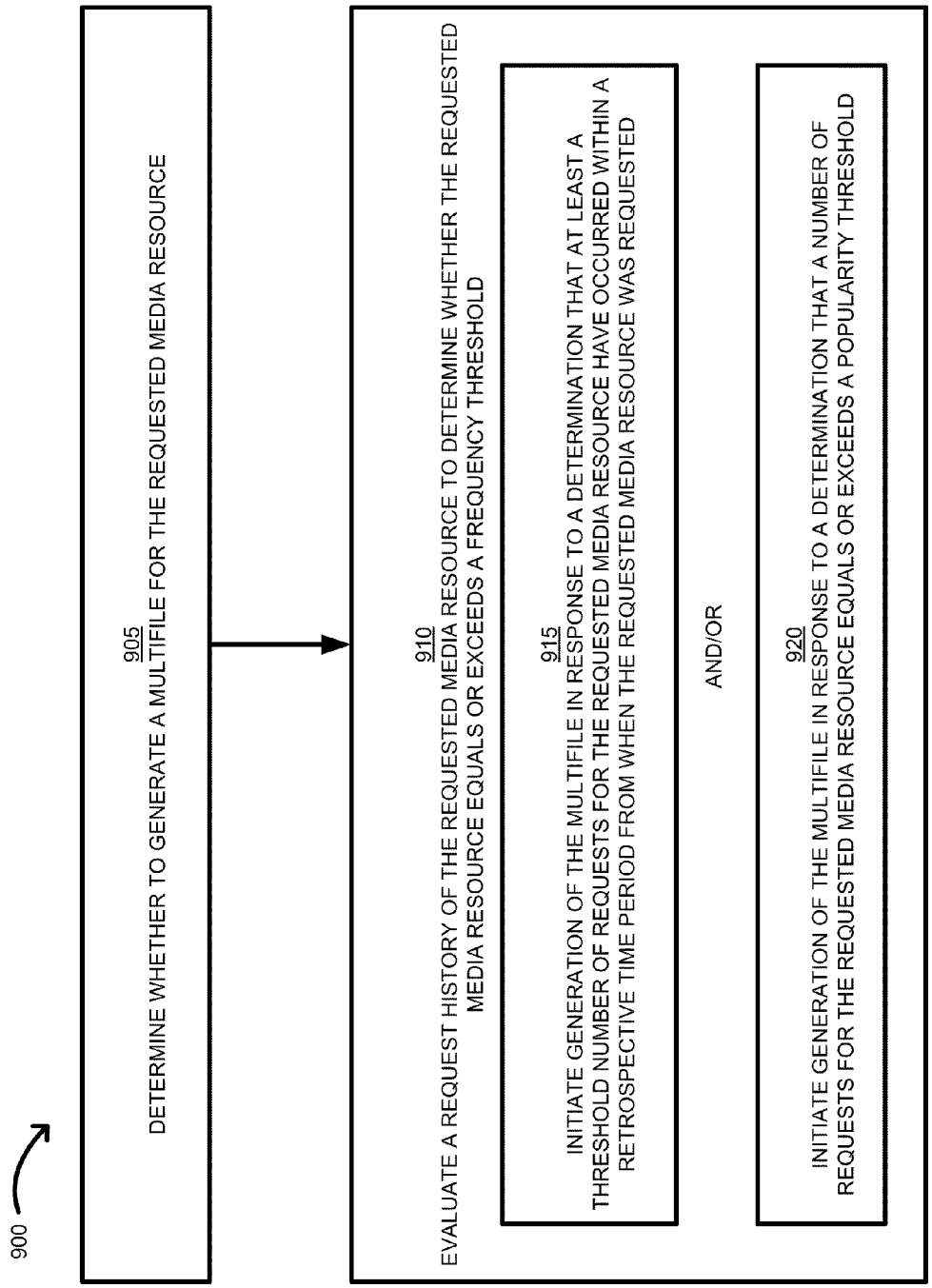
FIG. 9 is a flow chart that shows processing operations performed by a request manager in accordance with an example embodiment.

FIG. 9 is a flow chart 900 of processing steps that shows processing operations performed by the request manager 550 (i.e., resource processing module) in accordance with one example embodiment.

In step 905, for each monitored request, the request manager 550 determines whether to generate a multifile for the requested media resource.

In step 910, the request manager 550 evaluates a request history of the requested media resource to determine whether the requested media resource equals or exceeds a frequency threshold.

In step 915, the request manager 550 initiates generation of the multifile in response to a determination that at least a threshold number of requests for the requested media resource have occurred within a retrospective time period from when the requested media resource was requested. In other words, this technique is useful in determining the temporal popularity of a given media resource.

In step 920, the request manager 550 initiates generation of the multifile in response to a determination that a number of requests for the requested media resource equals or exceeds a popularity threshold. If, for example, the number of requests for the requested media resource does not equal or exceed the popularity threshold, then the request manager 550 can increment a request counter associated with that particular media resource.

Furthermore, according to one example embodiment the generated multifile represents sequential portions of the requested media resource stored in a substantially sequential manner in the storage system (e.g., disk-based storage system).

It should be noted that the eligibility of the requested media resource comprises using at least one of pattern recognition algorithms and sequence forecasting algorithms.

FIG. 10 is a flow chart 1000 of processing steps that shows processing operations performed by the request manager 550 (i.e., resource processing module) in accordance with one example embodiment.

In step 1005, request manager 550 receives a URL associated with a media resource request. In step 810, the request manager 550 determines whether the URL matches a regular expression. If there is no match, then multifile processing terminates at step 815.

If the URL does match the regular expression, in step 1020 the request manager 550 determines whether the number of requests for this particular media resource equals and/or exceeds a popularity threshold value.

If the threshold value (e.g., popularity indicator) is not met, the request manager 550 increments a counter associated with this particular media resource at step 1025. Multifile processing terminates after incrementing the counter at step 1030.

If the threshold value is equaled and/or exceeded, the request manager 550 determines whether a multifile has already been generated for this particular media resource. If a multifile has been generated, then multifile processing terminates at step 1040.

If a multifile has not been generated, the request manager 550 generates a multifile associated with the requested media resource at step 1045.

Although the present invention has been described with reference to various embodiments, it will be understood that the invention is not limited to the details thereof. Various modifications and substitutions will occur to those of ordinary skill in the art. All such substitutions are intended to be embraced within the scope of the invention.

What we claim is:

1. A computer-implemented method comprising:
   monitoring requests for media resources in a content delivery network;
   for each monitored request, determining whether to generate a multi-file for the requested media resource;
   initiating generation of the multi-file for the requested media resource, wherein the generated multi-file is stored in a storage system associated with the content delivery network; and
   determining that the requested media resource is eligible for multi-file generation when a Uniform Resource Locator (URL) associated with the requested media resource matches a regular expression.

2. A computer-implemented method as recited in claim 1, wherein the generated multi-file represents sequential portions of the requested media resource stored in a substantially sequential manner in the storage system.

3. A computer-implemented method as recited in claim 1, wherein the step of determining whether to generate the multi-file comprises evaluating a request history of the requested media resource to determine whether the requested media resource equals or exceeds a frequency threshold.

4. A computer-implemented method as recited in claim 1, wherein the step of initiating generation of the multi-file is performed in response to a determination that at least a threshold number of requests for the requested media resource have occurred within a retrospective time period from when the requested media resource was requested.

5. A computer-implemented method as recited in claim 1, wherein the step of determining whether to generate a multi-file for the requested media resource comprises:
   determining eligibility of the requested media resource for multi-file generation; and
   wherein the step of initiating generation of the multi-file is performed in response to a determination that a number of requests for the requested media resource equals or exceeds a popularity threshold.

6. A computer-implemented method as recited in claim 1, wherein the steps of monitoring and determining are performed by a process executing on a cache server in the content delivery network, and wherein the storage system is a disk-based storage system situated locally to the cache server in the content delivery network.

7. A computer-implemented method as recited in claim 1, wherein the step of initiating generation of the multi-file is performed by a process executing on a cache server in the content delivery network, and wherein the requested media resource is stored on a storage system situated locally to the cache server.

8. A computer-implemented method as recited in claim 1, wherein the step of initiating generation of the multi-file is performed by a process executing on a cache server in the content delivery network, and wherein the requested media resource is stored on a storage system remotely situated from the cache server in the content delivery network.

9. A computer-implemented method as recited in claim 1, wherein the steps of monitoring and determining are performed by a process executing on a cache server in the content delivery network, the computer-implemented method further comprising:
   in response to a determination that the requested media resource is eligible for multi-file generation, notifying at least one other server system in the content delivery network that the requested media resource is eligible for multi-file generation.

10. A system in a content delivery network comprising:
    a cache server configured to execute computer-readable instructions associated with a resource processing module;
    wherein the resource processing module is configured to monitor requests for media resources in the content delivery network;
    wherein the resource processing module is configured to determine, for each monitored request, whether to generate a multi-file for the requested media resource;
    wherein the resource processing module is further configured to initiate generation of the multi-file for the requested media resource, wherein the generated multi-file is stored in a storage system associated with the content delivery network wherein resource processing determines that the requested media resource is eligible for multi-file generation when a Uniform Resource Locator (URL) associated with the requested media resource matches a regular expression.

11. A system as recited in claim 10, wherein the generated multi-file represents sequential portions of the requested media resource stored in a substantially sequential manner in the storage system.

12. A system as recited in claim 10, wherein the resource processing module is configured to evaluate a request history of the requested media resource to determine whether the requested media resource equals or exceeds a frequency threshold.

13. A system as recited in claim 10, wherein the resource processing module is configured to initiate generation of the multi-file in response to a determination that at least a threshold number of requests for the requested media resource have occurred within a retrospective time period from when the requested media resource was requested.

14. A system as recited in claim 10, wherein the resource processing module is configured to:

determine eligibility of the requested media resource for multi-file generation, and wherein the resource processing module is further configured initiate generation of the multi-file in response to a determination that a number of requests for the requested media resource equals or exceeds a popularity threshold.

15. A system as recited in claim 10, wherein the storage system is a disk-based storage system situated locally to the cache server in the content delivery network.

16. A system as recited in claim 10, wherein the requested media resource is stored on a storage system situated locally to the cache server.

17. A system as recited in claim 10, wherein the requested media resource is stored on a storage system situated remotely from the cache server in the content delivery network.

18. A system as recited in claim 10 further comprising:

at least one other server system in the content delivery network; and wherein the resource processing module is configured to, in response to a determination that the requested media resource is eligible for multi-file generation, notify at least one other server system in the content delivery network that the requested media resource is eligible for multi-file generation.

* * * * *